United States Patent
Ben-Yitzhak

(10) Patent No.: US 12,548,128 B2
(45) Date of Patent: Feb. 10, 2026

(54) SYSTEMS, METHODS, AND MACHINE INSTRUCTIONS FOR RE-COLORING COLOR IMAGES

(71) Applicant: Given Imaging LTD., Yoqneam (IL)

(72) Inventor: Ori Ben-Yitzhak, Kiryat Tivon (IL)

(73) Assignee: GIVEN IMAGING LTD., Yoqneam (IL)

( * ) Notice: Subject to any disclaimer, the term of this patent is extended or adjusted under 35 U.S.C. 154(b) by 294 days.

(21) Appl. No.: 18/556,988

(22) PCT Filed: May 1, 2022

(86) PCT No.: PCT/IL2022/050447
§ 371 (c)(1),
(2) Date: Oct. 24, 2023

(87) PCT Pub. No.: WO2022/234567
PCT Pub. Date: Nov. 10, 2022

(65) Prior Publication Data
US 2024/0212113 A1    Jun. 27, 2024

Related U.S. Application Data

(60) Provisional application No. 63/183,677, filed on May 4, 2021.

(51) Int. Cl.
G06T 5/77 (2024.01)
G06T 11/00 (2006.01)

(52) U.S. Cl.
CPC ............... *G06T 5/77* (2024.01); *G06T 11/001* (2013.01); *G06T 2207/10024* (2013.01)

(58) Field of Classification Search
CPC ............ G06T 5/77; G06T 11/001; G06T 2207/10024; H04N 1/6027; H04N 1/6005; H04N 1/6075; H04N 1/62
See application file for complete search history.

(56) References Cited

U.S. PATENT DOCUMENTS

| 5,412,433 A | 5/1995 | Holland et al. |
| 2013/0195353 A1 | 8/2013 | Uslubas et al. |
| 2021/0097732 A1* | 4/2021 | Yamamoto ............... G06T 11/00 |

FOREIGN PATENT DOCUMENTS

| EP | 3437542 A1 | 2/2019 |
| WO | 2020079696 A1 | 4/2020 |

OTHER PUBLICATIONS

International Search Report and Written Opinion for PCT/IL2022/050447 dated Jul. 28, 2022 (13 pages).

(Continued)

Primary Examiner — Christopher Wait
(74) Attorney, Agent, or Firm — Carter, DeLuca & Farrell LLP

(57) ABSTRACT

A method for processing color images includes accessing a color image which uses a HSV color model where each pixel of the color image has a hue value, normalizing the hue value of each pixel to a normalized hue value, determining a first median as a median of the normalized hue values, re-coloring the normalized hue values of each pixel based on enlarging hue ranges within a range of a particular hue to provide re-colored hue values, determining a second median as a median of the re-colored hue values, shifting the re-colored hue values for each pixel based on a difference between the first median and the second median to provide shifted hue values, and de-normalizing the shifted hue values for each pixel to provide a processed color image.

15 Claims, 5 Drawing Sheets

(56) References Cited

OTHER PUBLICATIONS

Gokilavani C et al, "Comparative results performance analysis of various filters used to remove noises in retinal images", 2015 International Conference on Green Engineering and Technologies (IC-GET 2015), IEEE, Nov. 27, 2015, pp. 1-5.

* cited by examiner

SYSTEMS, METHODS, AND MACHINE INSTRUCTIONS FOR RE-COLORING COLOR IMAGES

CROSS-REFERENCE TO RELATED APPLICATIONS

The present application is a U.S. National Stage Application filed under 35 U.S.C. § 371 (a) of International Patent Application No. PCT/IL2022/050447, filed May 1, 2022, which claims the benefit of and priority to U.S. Provisional Application No. 63/183,677, filed May 4, 2021. The entire contents of each of the foregoing applications are hereby incorporated by reference herein.

FIELD

The disclosure relates to processing image color and, more particularly, to systems and methods for re-coloring color images while retaining structural information contained in the image.

BACKGROUND

Images contain information that is used for various purposes, and different purposes may benefit from certain type of information more than others. Image processing can be used to emphasize certain types of information in images over other types of information. For example, for certain purposes, image contrast can be enhanced to better detect boundaries or edges within an image, and image brightness can be enhanced to present darker regions by more shades. Similarly, image contrast can be decreased to identify stronger boundaries while de-emphasizing weaker boundaries, and image brightness can be decreased to present brighter regions by more shades. Different types of image processing are suited to different purposes, and there is no one-size fits all approach to image processing. Accordingly, there is interest in improving image processing for different purposes.

SUMMARY

Aspects of the present disclosure relate to processing an entire image to enhance at least portions of the image having particular hues, such as red hues. The images may be medical images or non-medical images. For medical images, enhancing portions of an image having red hues may show certain physiological features more clearly, such as blood vessels or colon polyps, among other things. Presenting certain physiological features more clearly may help healthcare providers better diagnose a person's physiological condition. Aspects of the present disclosure apply to color images captured by capsule endoscopy. For non-medical images, enhancing portions of an image having particular hues may show various features more clearly.

In accordance with aspects of the present disclosure, a method for processing color images includes accessing a color image which uses a HSV color model where each pixel of the color image has a hue value, normalizing the hue value of each pixel to a normalized hue value, determining a first median as a median of the normalized hue values, re-coloring the normalized hue values of each pixel based on enlarging hue ranges within a range of a particular hue to provide re-colored hue values, determining a second median as a median of the re-colored hue values, shifting the re-colored hue values for each pixel based on a difference between the first median and the second median to provide shifted hue values, and de-normalizing the shifted hue values for each pixel to provide a processed color image.

In various embodiments of the method, the normalized hue values are between 0 and 1, inclusive, and the particular hue corresponds to normalized hue values of 0 and 1.

In various embodiments of the method, re-coloring the normalized hue values includes computing new hue values as:

$$H_{new} = (H' - 0.5)^{power} * 2^{power-1} + 0.5$$

where H' is a normalized hue value and where power is a positive odd number, and determining the re-colored hue values based on the new hue values.

In various embodiments of the method, determining the re-colored hue values based on the new hue values includes determining the re-colored hue values as:

$$H'' = \alpha * H_{new} + (1 - \alpha) * H'$$

where $\alpha$ is a value in a range of $0 < \alpha \leq 1$.

In various embodiments of the method, shifting the re-colored hue values for each pixel includes providing the shifted hue values as:

$$H_{shifted} = H'' + \Delta_{median}$$

where $\Delta_{median}$ is the difference between the first median and the second median.

In accordance with aspects of the present disclosure, a system for processing color images includes at least one processor and at least one memory storing instructions. The instructions, when executed by the at least one processor, cause the system to perform a method that includes accessing a color image which uses a HSV color model where each pixel of the color image has a hue value, normalizing the hue value of each pixel to a normalized hue value, determining a first median as a median of the normalized hue values, re-coloring the normalized hue values of each pixel based on enlarging hue ranges within a range of a particular hue to provide re-colored hue values, determining a second median as a median of the re-colored hue values, shifting the re-colored hue values for each pixel based on a difference between the first median and the second median to provide shifted hue values, and de-normalizing the shifted hue values for each pixel to provide a processed color image.

In various embodiments of the system, the normalized hue values are between 0 and 1, inclusive, and the particular hue corresponds to normalized hue values of 0 and 1.

In various embodiments of the system, in re-coloring the normalized hue values, the instructions, when executed by the at least one processor, cause the system to compute new hue values as:

$$H_{new} = (H' - 0.5)^{power} * 2^{power-1} + 0.5$$

where H′ is a normalized hue value and where power is a positive odd number, and determine the re-colored hue values based on the new hue values.

In various embodiments of the system, in determining the re-colored hue values based on the new hue values, the instructions, when executed by the at least one processor, cause the system to determine the re-colored hue values as:

$$H'' = \alpha * H_{new} + (1 - \alpha) * H'$$

where α is a value in a range of 0<α≤1.

In various embodiments of the system, in shifting the re-colored hue values for each pixel, the instructions, when executed by the at least one processor, cause the system to provide the shifted hue values as:

$$H_{shifted} = H'' + \Delta_{median}$$

where $\Delta_{median}$ is the difference between the first median and the second median.

In accordance with aspects of the present disclosure, a computer-readable medium stores machine instructions which, when executed by at least one processor of a computer, cause the computer to perform a method that includes accessing a color image which uses a HSV color model where each pixel of the color image has a hue value, normalizing the hue value of each pixel to a normalized hue value, determining a first median as a median of the normalized hue values, re-coloring the normalized hue values of each pixel based on enlarging hue ranges within a range of a particular hue to provide re-colored hue values, determining a second median as a median of the re-colored hue values, shifting the re-colored hue values for each pixel based on a difference between the first median and the second median to provide shifted hue values, and de-normalizing the shifted hue values for each pixel to provide a processed color image.

In various embodiments of the computer-readable medium, the normalized hue values are between 0 and 1, inclusive, and the particular hue corresponds to normalized hue values of 0 and 1.

In various embodiments of the computer-readable medium, in re-coloring the normalized hue values, the machine instructions, when executed by the at least one processor, cause the computer to compute new hue values as:

$$H_{new} = (H' - 0.5)^{power} * 2^{power-1} + 0.5$$

where H′ is a normalized hue value and where power is a positive odd number, and determine the re-colored hue values based on the new hue values.

In various embodiments of the computer-readable medium, in determining the re-colored hue values based on the new hue values, the machine instructions, when executed by the at least one processor, cause the computer to determine the re-colored hue values as:

$$H'' = \alpha * H_{new} + (1 - \alpha) * H'$$

where α is a value in a range of 0<α≤1.

In various embodiments of the computer-readable medium, in shifting the re-colored hue values for each pixel, the machine instructions, when executed by the at least one processor, cause the computer to provide the shifted hue values as:

$$H_{shifted} = H'' + \Delta_{median}$$

where $\Delta_{median}$ is the difference between the first median and the second median.

Further details and aspects of exemplary embodiments of the present disclosure are described in more detail below with reference to the appended figures.

BRIEF DESCRIPTION OF DRAWINGS

The above and other aspects and features of the disclosure will become more apparent in view of the following detailed description when taken in conjunction with the accompanying drawings wherein like reference numerals identify similar or identical elements.

DETAILED DESCRIPTION

Figure 1:
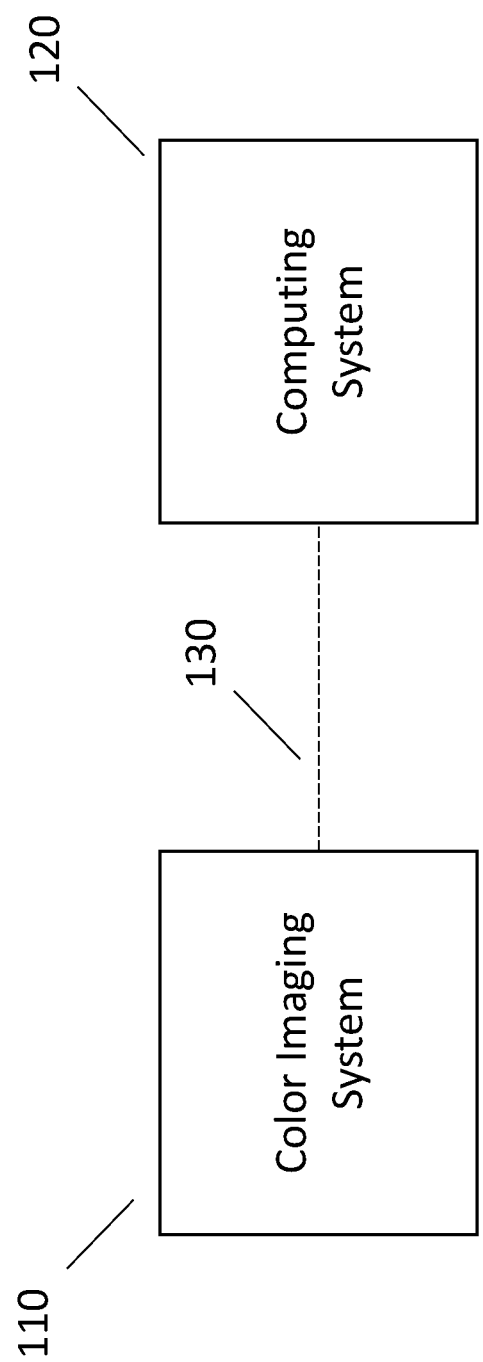
FIG. 1 is a block diagram of an exemplary system for capturing and processing color images, in accordance with aspects of the disclosure.

The present disclosure relates to processing an entire image to enhance at least portions of the image having particular hues, such as red hues. The images may be medical images or non-medical images. For medical images, enhancing portions of an image having red hues may show certain physiological features more clearly, such as blood vessels or colon polyps, among other things. Presenting certain physiological features more clearly may help healthcare providers better diagnose a person's physiological condition. Aspects of the present disclosure apply to color images captured by capsule endoscopy. For non-medical images, enhancing portions of an image having particular hues may show various features more clearly.

Image re-coloring may be helpful for enhancing certain information in a color image. However, if taken too far, changes to image colors may impair the usefulness of the image. Aspects of the present disclosure balance such concerns to re-color an image while preserving structural information contained in the image to an extent. In accordance with aspects of the present disclosure, the techniques of the present disclosure enlarge the hue range of particular hues in an image, such as enlarging the hue range of red hues in an image, while preserving structural and textural information in the image completely or to a large extent. By enlarging the hue range of particular hues in an image, the image processing of the present disclosure may operate to make image portions having the particular hue be more discernible.

In the following detailed description, specific details are set forth in order to provide a thorough understanding of the disclosure. However, it will be understood by those skilled in the art that the disclosure may be practiced without these specific details. In other instances, well-known methods, procedures, and components have not been described in detail so as not to obscure the present disclosure. Some features or elements described with respect to one system may be combined with features or elements described with respect to other systems. For the sake of clarity, discussion of same or similar features or elements may not be repeated.

Although the disclosure is not limited in this regard, discussions utilizing terms such as, for example, "processing," "computing," "calculating," "determining," "establishing," "analyzing," "checking," or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although the disclosure is not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items. Unless explicitly stated, the methods described herein are not constrained to a particular order or sequence. Additionally, some of the described methods or elements thereof can occur or be performed simultaneously, at the same point in time, or concurrently.

FIG. 1 shows a block diagram of a system for capturing and processing color images. The system generally includes a color imaging system 110 configured to capture images in color and a computing system 120 (e.g., local system and/or remote system) configured to process the captured color images. The color imaging system 110 may be any color image capturing system or device, such as an endoscope, a capsule endoscope, a surgical imaging device, a smartphone, a digital camera, or another type of color image capturing system or device. In various embodiments, the color imaging system 110 may be a capsule endoscope. A capsule endoscope is a swallowable imaging device (e.g., in the shape of a capsule) configured to capture images of a gastrointestinal tract ("GIT") as the imaging device travels through the GIT. The images may be stored on the imaging device and/or transmitted to a receiving device. In some capsule endoscopy systems, the receiving device may be located on the patient who swallowed the CE imaging device and may, for example, take the form of a belt worn by the patient or a patch secured to the patient. The color imaging system 110 can store captured color images in various file types, such as JPEG, GIF, PNG, or TIFF, among others. The stored color images can use various color models or color spaces, such as RGB, CMYK, YCbCr, CIELAB, CIEXYZ, or HSV, among others. The terms "color model" and "color space" will be used interchangeably herein.

The computing system 120 may be any system or device which can perform computations to process color images, including local systems such as a desktop computer, laptop computer, smartphone, or tablet device, among others, and/or a remote computing system such as server computing systems or cloud computing systems, among others. In accordance with aspects of the present disclosure, the computing system 120 may process an image to enlarge the difference between particular hues in the image, such as enlarging the difference between red hues in an image. The image processing may preserve other colors to an extent and preserve structural and textural information in the image to an extent. In various embodiments, the image processing may preserve other colors as much as possible and may preserve all structural and textural information in the image. The image processing operations will be described in more detail below in connection with FIGS. 3 and 4.

With continuing reference to FIG. 1, the computing system 120 may receive or access the color images captured by the color imaging system 110 through various routes 130. In various embodiments, the color imaging system 110 may be directly coupled to the computing system 120 by a cable (e.g., USB cable) or by a wireless connection (e.g., Bluetooth). In various embodiments, the color imaging system 110 may be in communication with the computing system 120 through one or more communication networks, such as Wi-Fi, Ethernet, cellular networks, the Internet, and/or an Intranet, among others, and/or through one or more intermediate devices, such as intermediate servers, intermediate storage devices, or intermediate communication devices, among other things. In various embodiments, the computing system 120 may receive the color images captured by the color imaging system 110 by a portable storage medium, such as a USB drive, a CD, a DVD, and/or a SD card, among others. Such and other manners of conveying color images from the color imaging device 110 to the computing device 120 are contemplated to be within the scope of the present disclosure.

Figure 2:
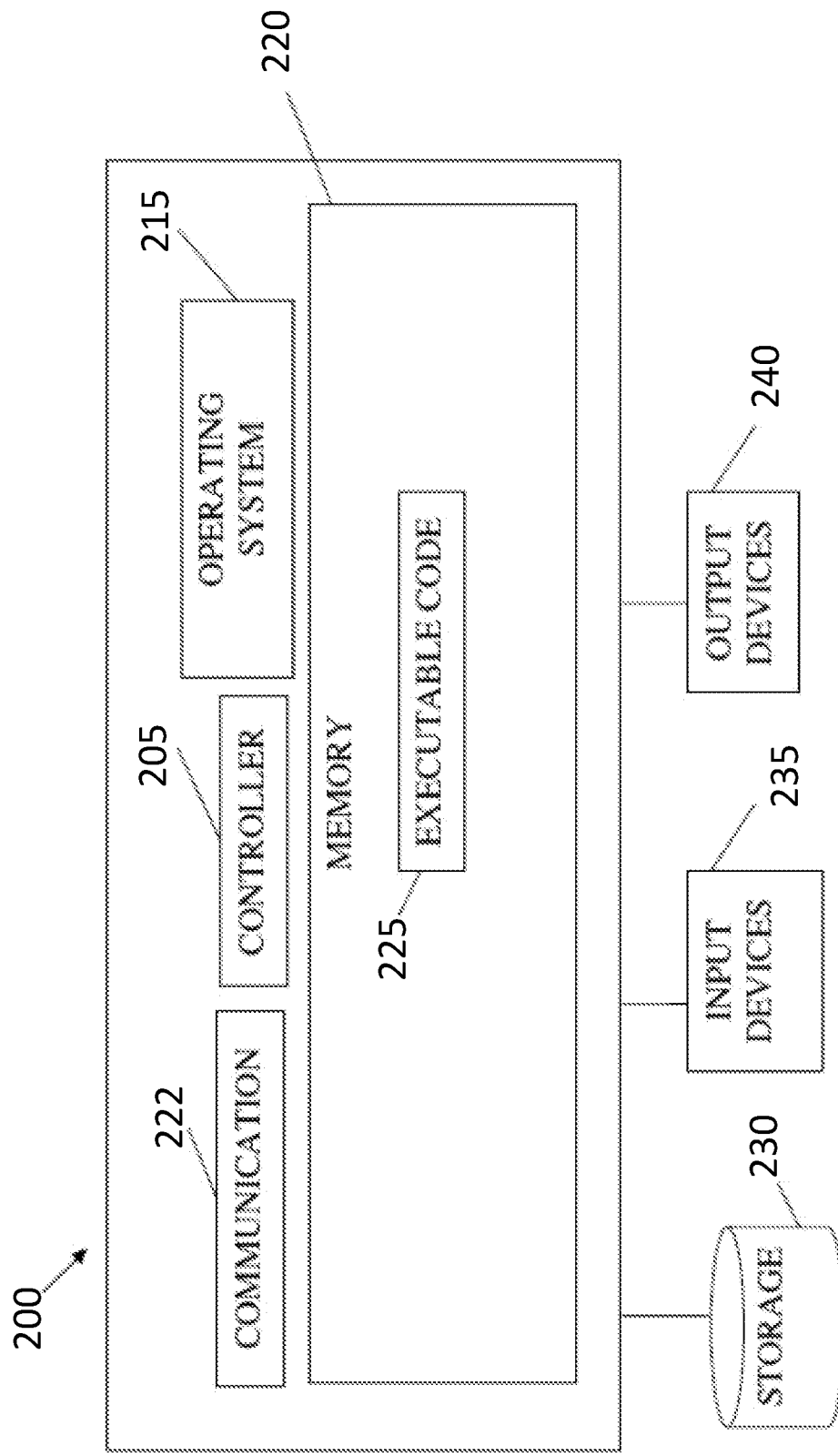
FIG. 2 is a block diagram of an exemplary computing system, in accordance with aspects of the present disclosure.

FIG. 2 shows a block diagram of an exemplary computing system 200 that may be used for the computing system 120 of FIG. 1. Computing system 200 may include a processor/controller 205 that may be or include, for example, one or more central processing units (CPU), one or more Graphics Processing Unit(s) (GPU or GPGPU), a microcontroller, an ASIC chip, or any other type of processing device. The computing system 200 also includes an operating system 215, a memory 220, a storage 230, input devices 235 and output devices 240.

Memory 220 may be or may include, for example, a Random Access Memory (RAM), a read-only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 220 may be or may include a plurality of different memory units. The memory 220 also may include or may be a hard desk drive or a solid state drive or another type of mass storage. Memory 220 may store for example, instructions to carry out a method (e.g., executable code 225), and/or data such as color images. Executable code 225 may be any executable code, e.g., an application, a program, a process, task or script. Executable code 225 may be executed by controller 205 possibly under control of operating system 215. One or more processors/controllers 205 may be configured to execute the executable code 225 to carry out methods, aspects, or embodiments, of the present disclosure. The operating system 215 may be or may include a built-in operating system, any code segment designed and/or configured to perform tasks involving coordination, scheduling, arbitration, supervising, controlling or otherwise managing operation of computing system 200, such as, scheduling execution of programs.

Storage 230 may be or may include, for example, a hard disk drive, a solid state drive, a Compact Disk (CD) drive, a DVD drive, a universal serial bus (USB) device, or another type of removable or fixed storage device. Data such as instructions, code, and color images, among others, may be stored in storage 230 and may be loaded from storage 230 into memory 220 where it may be executed or processed by processor/controller 205. Input devices 235 may be or may include, for example, a mouse, a keyboard, a touch screen or pad, or any suitable input device. Output devices 240 may include one or more monitors, screens, or displays, and/or any other suitable output devices. The input devices 235 and output devices 240 may include any other type of input and/or output device. A communication component 222 of the computing system 200 may allow communications with remote or external devices, e.g., via the Internet or another network, via radio, or via a suitable network protocol such as File Transfer Protocol (FTP), etc.

The embodiment of FIG. 2 is exemplary, and variations are contemplated to be within the scope of the present disclosure. For example, a computing system 200 may not have all of the components illustrated in FIG. 2 or may have other components not shown in FIG. 2. In various embodiments, a computing system 200 may include more than one of any component. In various embodiments, the computing system 200 may be a distributed system such that some components may be at one location while other components may be at one or more other locations. Such and other variations are contemplated to be within the scope of the present disclosure.

Figure 3:
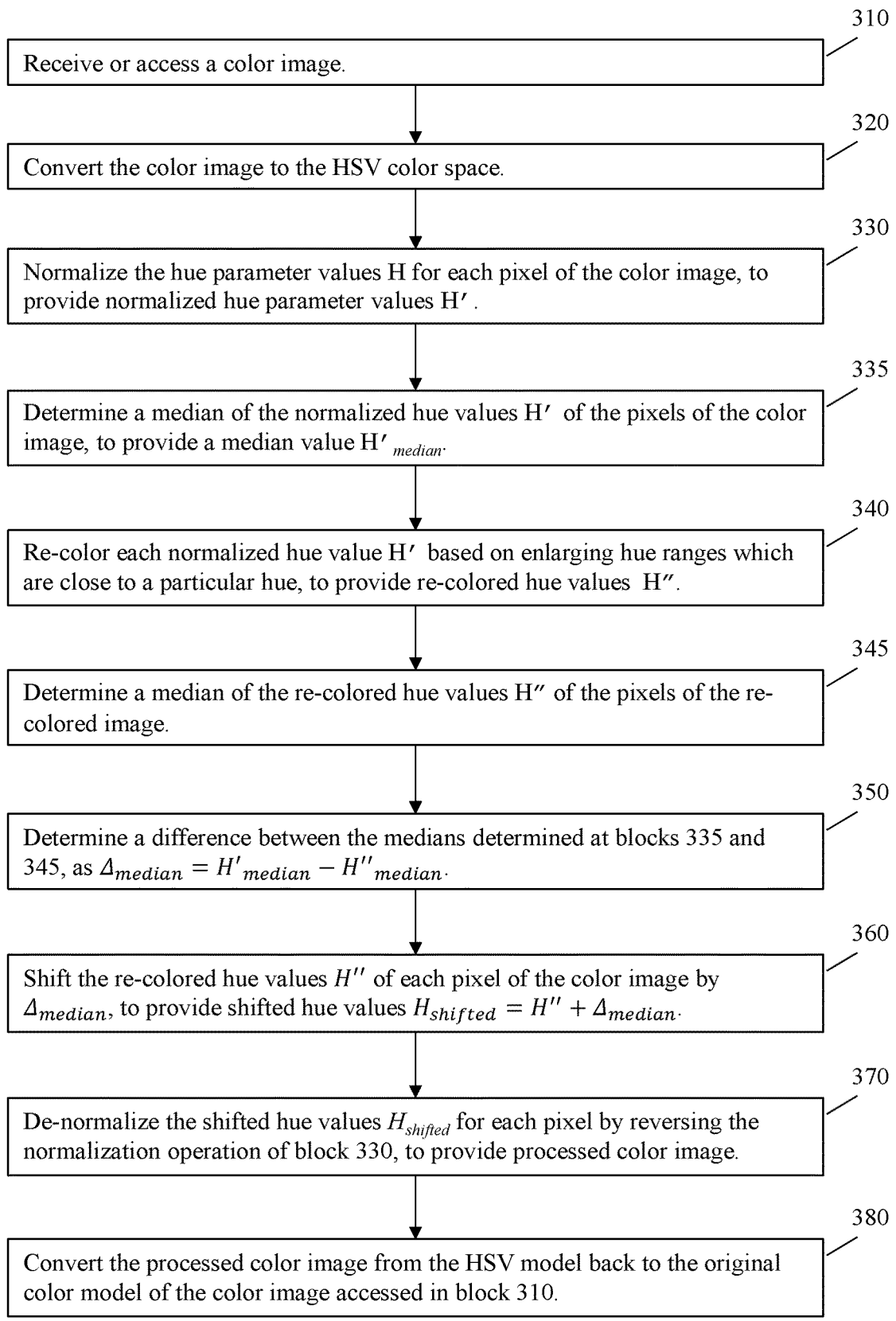
FIG. 3 is a flow diagram of an exemplary operation for processing color images, in accordance with aspects of the present disclosure.
Figure 4:
FIG. 4 is a diagram of an exemplary hue parameter range, in accordance with aspects of the disclosure.

Referring now to FIG. 3, there is shown a flow diagram of an exemplary operation for processing color images, according to aspects of the present disclosure. As mentioned above with respect to FIG. 1, the stored color images captured by the color imaging system 120 can use various color models, such as RGB, CMYK, YCbCr, CIELAB, CIEXYZ, or HSV, among others. The operations of FIG. 3 are performed in the HSV color space. Persons skilled in the art will understand how to convert color images from various colors spaces to the HSV color space and will understand to how to convert color images from the HSV color space back to the various color spaces. The operation of FIG. 3 can be performed by the computing system 120 of FIG. 1. FIG. 2 shows an example of such computing system.

With reference to FIG. 3, at block 310, the operation includes receiving or accessing a color image. The color image may be captured by the color imaging system 110 of FIG. 1 and may be accessed or received in the manners described above in connection with FIG. 1 or accessed or received in another manner. At block 320, the operation includes converting the color image to the HSV color space. As mentioned above, persons skilled in the art will understand how to convert color images from various color spaces to the HSV color space. As persons skilled in the art will understand, the HSV color space represents each pixel by three parameters—hue parameter H, saturation parameter S, and brightness parameter V. Each color may be defined by a combination of values for these three parameters. The hue parameter H corresponds to a "color wheel" and is defined in degrees, which ranges from 0 degrees to 360 degrees. A hue value of 0 degrees corresponds to primary red, a value of 120 degrees corresponds to primary green, and a value of 240 degrees corresponds to primary blue. Combinations of the primary colors are represented by other values of the hue parameter H. A value of 360 degrees completes the color wheel and circles back to primary red. In certain implementations of the HSV color space, the hue parameter H may have a different range of values rather than 0 to 360, but such implementations will maintain the same model of the HSV color model.

At block 330, the operation involves normalizing the hue parameter values H for each pixel of the color image, based on, for example, a mapping of the hue parameter H range of 0 to 360 to a hue range between 0 to 1. In various embodiments, the normalization may be a simple scaling. For example, the operation of block 330 may divide each hue parameter value H by 360 to provide a normalized hue parameter H'=H/360. Such an embodiment would result in the normalized hue parameter range shown in FIG. 4, in which a hue value of 0 corresponds to primary red, a value of ⅓ corresponds to primary green, a value of ⅔ corresponds to primary blue, and a value of 1 returns to primary red. In various embodiments, the operation of block 330 may further involve a value shift or modulo operation, such as H'=((H+120) modulo 360)/360, which would result in normalized hue values H'=0 and 1 corresponding to primary blue. As another example, the conversion operation H'=((H+240) modulo 360)/360, would result in normalized hue values H'=0 and 1 corresponding to primary green. Other normalization operations are contemplated for providing a normalized hue parameter H' range.

At block 335, the operation involves determining a median of the normalized hue values H' of the pixels of the color image. The median determined at block 335 can be denoted as $H'_{median}$.

At block 340, the operation involves re-coloring each normalized hue parameter value H' by enlarging the hue ranges which are close to 0 or close to 1, such as within at least a range of 0 or within a range of 1. In the exemplary embodiment of FIG. 4, enlarging the hue ranges which are close to 0 or 1 operates to make red portions of an image more discernible. In embodiments where hue values H'=0 or 1 correspond to another hue, the re-coloring operation of block 340 operates to make portions close to that hue more discernible. The operation of block 340 can be performed in various ways. In accordance with aspects of the present disclosure, the re-coloring operation of block 340 can be performed by the following exemplary computation:

$$H_{new} = (H' - 0.5)^{power} * 2^{power-1} + 0.5$$

$$H'' = \alpha * H_{new} + (1 - \alpha) * H'$$

where power is a positive odd number (e.g., 1, 3, 5, . . . ), and a is a value in the range of 0<α≤1. In various embodiments, the value of a operates to provide a blend of the normalized hue value H' and the hue value $H_{new}$, and the value of a can be determined based on a desired degree of blending. Where no blending is desired, the value of a can be 1.

In the above computations, $H_{new}$=H' when H'=0, 0.5, or 1, or when power=1. In the re-coloring operation, certain values of H' closer to 0.5 are pulled more towards 0.5, and certain values of H' closer to 0 or 1 are pulled less towards 0.5 while still being relatively close to 0 or 1. For example, for power=3, when H'=0.6, the computation produces $H_{new}$= $(0.1)^3 \times 2^2 + 0.5 = 0.504$, such that the operation pulled the hue value about 96% toward 0.5 (i.e., 0.096/(0.6−0.5) =0.96=96%). When H'=0.99, the computation produces $H_{new}$=$(0.49)^3 \times 2^2 + 0.5 \approx 0.9706$, such that the operation pulled the hue value about 3.96% toward 0.5 (i.e., 0.0194/(0.99–0.5)≈0.0396=3.96%). In this manner, portions of an image having hue values closer to 0 or 1 will be presented by an enlarged range of hues. In various embodiments, portions of an image having hue values farther away from 0 or 1 may be presented by a reduced range of hues and/or may be presented by hues farther away from 0 or 1, such as hue values near 0.5. In this manner, information in hues close to 0 or 1 may be made more discernible while information in hues farther away from 0 or 1 may be diminished to an extent, in various embodiments.

Figure 5:
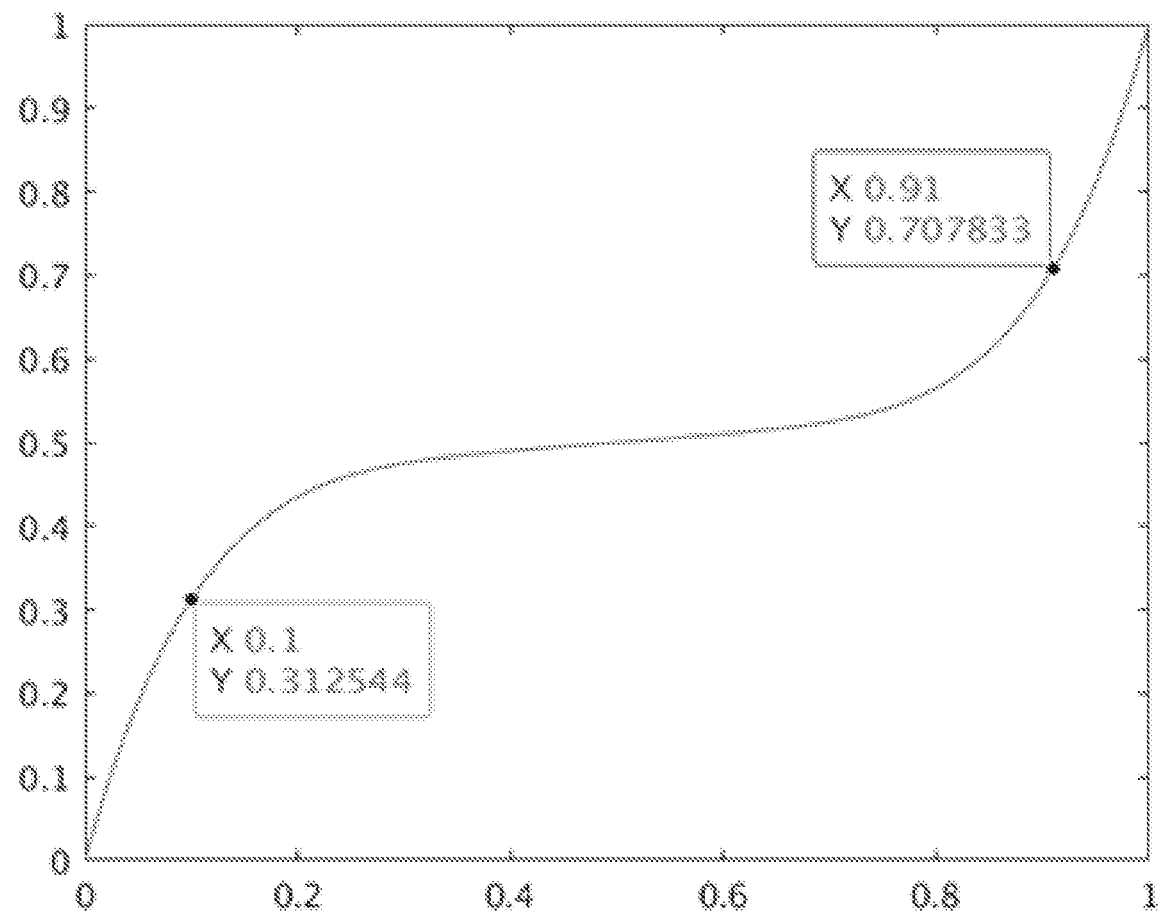
FIG. 5 is a diagram of an exemplary re-coloring effect, in accordance with aspects of the present disclosure.

An example of the re-coloring effect of the above computation is shown in FIG. 5, in which the x-axis represents the normalized hue value H' and the y-axis represents the re-colored hue value H". In the example of FIG. 5, the value of α may be 1 such that there is no blending. As shown in FIG. 5, for the hue range on the x-axis closer to 0 and closer to 1, the computation changes the hue range to an enlarged hue range on the y-axis. When the hue values of 0 and 1 correspond to primary red, as in FIG. 4, an effect of the re-coloring is that red portions of the image will be more discernible. When the hue values of 0 and 1 correspond to primary green, an effect of the re-coloring is that green portions of the image will be more discernible, and so on and so forth when the hue values 0 and 1 correspond to another hue. At the same time, in the embodiment of FIG. 5, for a hue range closer to 0.5 on the x-axis, the computation changes the hue range to a reduced hue range on the y-axis.

With continuing reference to FIG. 3, at block 345, the operation involves determining a median of the re-colored hue values H" of the pixels of the re-colored image. The median determined at block 345 can be denoted as $H"_{median}$. At block 350, the operation involves determining a difference between the medians determined at blocks 335 and 345, as $\Delta_{median} = H'_{median} - H"_{median}$. At block 360, the operation involves shifting the re-colored hue values H" of each pixel of the color image by $\Delta_{median}$. That is, for each pixel, the hue value becomes $H_{shifted} = H" + \Delta_{median}$. The operation of block 360 may operate to compensate for the effect in block 340 of "pulling" hue values closer to 0.5, which pulls hues farther away from primary red in the embodiment of FIG. 4. By shifting the re-colored hue values by $\Delta_{median}$, the hues are moved back closer to primary red (or another primary hue) while retaining the greater discernability provided by the re-coloring operation.

At block 370, the operation involves de-normalizing the shifted hue values $H_{shifted}$ for each pixel by reversing the normalization operation of block 330. Different normalization operations will have different reverse operations, and persons skilled in the art will understand how to reverse a normalization operation. The result of the operation at block 370 is a processed color image in the HSV color space. At block 380, the operation involves converting the processed color image from the HSV model back to the original color model of the color image accessed in block 310. As mentioned above, persons skilled in the art will understand how to convert images between color models and will understand how to convert images from HSV color model to another color model. The result of the operation at block 380 is a fully processed color image using the original color model.

The operation of FIG. 3 is exemplary, and variations are contemplated to be within the scope of the present disclosure. In various embodiments, the operations of FIG. 3 may not involve normalization and de-normalization, and the concepts and principles for re-coloring a color image may be applied to the original HSV color model. In various embodiments, the operations of FIG. 3 may not involve computing medians and may not involve shifting re-colored hues by a different of medians. In various embodiments, the operations of FIG. 3 may be varied to make a particular hue more discernible where the particular hue corresponds to hue values other than 0 and 360 in the HSV color model. For example, the operations of FIG. 3 may make greenish hues more discernible, where primary green corresponds to hue value of 120, or the operations of FIG. 3 may make bluish hues more discernible, where primary blue corresponds to hue value of 240. One or more of such variations may be combined in various ways. Such and other variations are contemplated to be within the scope of the present disclosure.

Accordingly, the description above provides systems and methods for re-coloring a color image to make image portions having a particular hue be more discernible. The aspects, principles, and concepts disclosed herein may be applied to color images in general.

Figure 6:
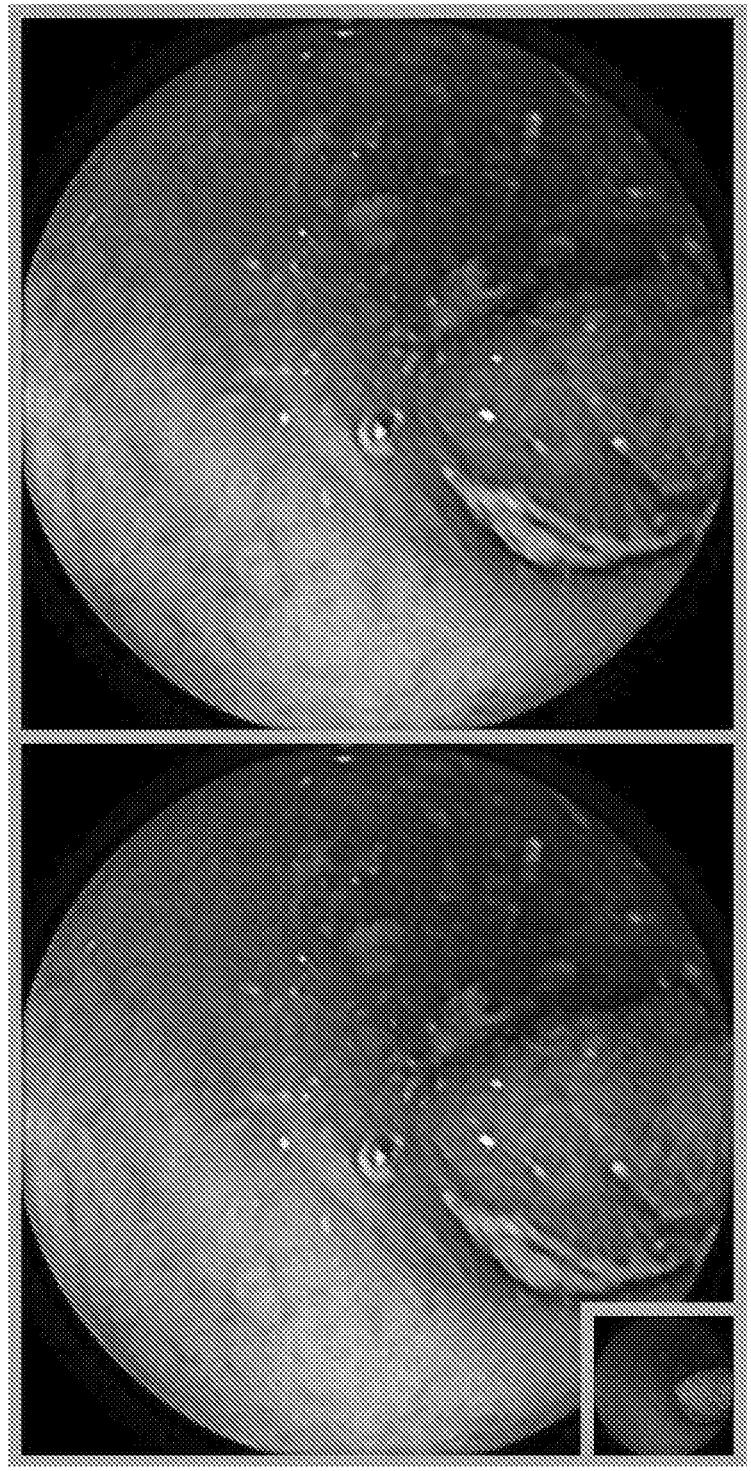
FIG. 6 is a diagram of exemplary color images before and after image processing, in accordance with aspects of the present disclosure.

Aspects of the present disclosure may be particularly suitable for processing medical images of internal organs or tissue, which typically have the most important information in reddish hues and not much information in other hues. Because such medical images do not have much information in other hues, the exemplary re-coloring effect shown in FIG. 5 would not lose an unacceptable amount of information represented by other hues, i.e., information represented by hue values farther away from 0 or 1. FIG. 6 shows an example of a medical image of tissue before applying the re-coloring technology of the present disclosure, on the left side, and after applying the re-coloring technology of the present disclosure, on the right side.

Aspects of the present disclosure may be applied to color images of a gastrointestinal tract captured by a capsule endoscope. Capsule endoscopy images may be presented to healthcare providers in a study. Aspects of exemplary user interfaces for displaying such a study are described in co-pending International Patent Application Publication No. WO/2020/079696, entitled "Systems and Methods for Generating and Displaying a Study of a Stream of In-Vivo Images," which is hereby incorporated by reference in its entirety. In some embodiments, only up to a few hundreds of images are displayed for the user's review. In some systems, the number of images displayed for the user's review is up to an order of one-thousand or thousands. A healthcare provider may build his or her understanding of a patient's condition by reviewing a study. Browsing through images processed by the techniques of the present disclosure may significantly ease the review process for the user and reduce the reading time per case and may lead to better diagnosis.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. To the extent consistent, any or all of the aspects detailed herein may be used in conjunction with any or all of the other aspects detailed herein. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A method for processing color images, comprising:
accessing a color image using a HSV color model, each pixel of the color image having a hue value;
normalizing the hue value of each pixel to a normalized hue value;
determining a first median as a median of the normalized hue values;
re-coloring the normalized hue values of each pixel based on enlarging hue ranges within a range of a particular hue, to provide re-colored hue values;
determining a second median as a median of the re-colored hue values;
shifting the re-colored hue values for each pixel, based on a difference between the first median and the second median, to provide shifted hue values; and
de-normalizing the shifted hue values for each pixel to provide a processed color image.

2. The method according to claim 1, wherein the normalized hue values are between 0 and 1, inclusive, wherein the particular hue corresponds to normalized hue values of 0 and 1.

3. The method according to claim 2, wherein re-coloring the normalized hue values includes:
computing new hue values as:

$$H_{new} = (H' - 0.5)^{power} * 2^{power-1} + 0.5$$

where H' is a normalized hue value and where power is a positive odd number; and
determining the re-colored hue values based on the new hue values.

4. The method according to claim 3, wherein determining the re-colored hue values based on the new hue values includes determining the re-colored hue values as:

$$H'' = \alpha * H_{new} + (1 - \alpha) * H'$$

where $\alpha$ is a value in a range of $0 < \alpha \leq 1$.

5. The method according to claim 4, wherein shifting the re-colored hue values for each pixel includes providing the shifted hue values as:

$$H_{shifted} = H'' + \Delta_{median}$$

where $\Delta_{median}$ is the difference between the first median and the second median.

6. A system for processing color images, comprising:
at least one processor; and
at least one memory storing instructions which, when executed by the at least one processor, cause the system to perform a method comprising:
accessing a color image using a HSV color model, each pixel of the color image having a hue value;
normalizing the hue value of each pixel to a normalized hue value;
determining a first median as a median of the normalized hue values;
re-coloring the normalized hue values of each pixel based on enlarging hue ranges within a range of a particular hue, to provide re-colored hue values;
determining a second median as a median of the re-colored hue values;
shifting the re-colored hue values for each pixel, based on a difference between the first median and the second median, to provide shifted hue values; and
de-normalizing the shifted hue values for each pixel to provide a processed color image.

7. The system according to claim 6, wherein the normalized hue values are between 0 and 1, inclusive, wherein the particular hue corresponds to normalized hue values of 0 and 1.

8. The system according to claim 7, wherein in re-coloring the normalized hue values, the instructions, when executed by the at least one processor, cause the system to:
compute new hue values as:

$$H_{new} = (H' - 0.5)^{power} * 2^{power-1} + 0.5$$

where H' is a normalized hue value and where power is a positive odd number; and determine the re-colored hue values based on the new hue values.

9. The system according to claim 8, wherein in determining the re-colored hue values based on the new hue values, the instructions, when executed by the at least one processor, cause the system to determine the re-colored hue values as:

$$H'' = \alpha * H_{new} + (1-\alpha) * H'$$

where $\alpha$ is a value in a range of $0<\alpha\leq 1$.

10. The system according to claim 9, wherein in shifting the re-colored hue values for each pixel, the instructions, when executed by the at least one processor, cause the system to provide the shifted hue values as:

$$H_{shifted} = H'' + \Delta_{median}$$

where $\Delta_{median}$ is the difference between the first median and the second median.

11. A non-transitory computer-readable medium storing machine instructions which, when executed by at least one processor of a computer, cause the computer to perform a method comprising:

accessing a color image using a HSV color model, each pixel of the color image having a hue value;

normalizing the hue value of each pixel to a normalized hue value;

determining a first median as a median of the normalized hue values;

re-coloring the normalized hue values of each pixel based on enlarging hue ranges within a range of a particular hue, to provide re-colored hue values;

determining a second median as a median of the re-colored hue values;

shifting the re-colored hue values for each pixel, based on a difference between the first median and the second median, to provide shifted hue values; and de-normalizing the shifted hue values for each pixel to provide a processed color image.

12. The computer-readable medium according to claim 11, wherein the normalized hue values are between 0 and 1, inclusive, wherein the particular hue corresponds to normalized hue values of 0 and 1.

13. The computer-readable medium according to claim 12, wherein in re-coloring the normalized hue values, the machine instructions, when executed by the at least one processor, cause the computer to:

compute new hue values as:

$$H_{new} = (H' - 0.5)^{power} * 2^{power-1} + 0.5$$

where H' is a normalized hue value and where power is a positive odd number; and determine the re-colored hue values based on the new hue values.

14. The computer-readable medium according to claim 13, wherein in determining the re-colored hue values based on the new hue values, the machine instructions, when executed by the at least one processor, cause the computer to determine the re-colored hue values as:

$$H'' = \alpha * H_{new} + (1-\alpha) * H'$$

where $\alpha$ is a value in a range of $0<\alpha\leq 1$.

15. The computer-readable medium according to claim 14, wherein in shifting the re-colored hue values for each pixel, the machine instructions, when executed by the at least one processor, cause the computer to provide the shifted hue values as:

$$H_{shifted} = H'' + \Delta_{median}$$

where $\Delta_{median}$ is the difference between the first median and the second median.

* * * * *